(12) United States Patent
Lia et al.

(10) Patent No.: US 7,932,920 B2
(45) Date of Patent: Apr. 26, 2011

(54) METHOD AND APPARATUS FOR VIDEO CONFERENCING HAVING DYNAMIC PICTURE LAYOUT (75) Inventors: Tom Erik Lia, Askim (NO); Bjorn Aalerud, Lovenstad (NO); Geir Scott Nilsen, Olso (NO)

(73) Assignee: TANDBERG Telecom AS, Lysaker (NO)

( * ) Notice: Subject to any disclaimer, the term of this patent is extended or adjusted under 35 U.S.C. 154(b) by 1373 days.

(21) Appl. No.: 11/378,978

(22) Filed: Mar. 17, 2006

(65) Prior Publication Data
US 2006/0158510 A1    Jul. 20, 2006

Related U.S. Application Data

(63) Continuation of application No. 10/601,095, filed on Jun. 20, 2003, now Pat. No. 7,034,860.

(51) Int. Cl.
*H04N 7/14* (2006.01)
(52) U.S. Cl. ............... 348/14.09; 348/14.08; 348/14.12
(58) Field of Classification Search .... 348/14.01–14.16; 370/260–261; 715/753, 755, 751
See application file for complete search history.

(56) References Cited

U.S. PATENT DOCUMENTS

| | | | |
|---|---|---|---|
| 5,600,646 A | 2/1997 | Polomski | |
| 5,764,227 A | 6/1998 | Ishimine | |
| 5,838,664 A | 11/1998 | Polomski | |
| 5,894,321 A | 4/1999 | Downs et al. | |
| 5,963,547 A | 10/1999 | O'Neil et al. | |
| 6,124,881 A | 9/2000 | Terui et al. | |
| 6,288,740 B1 | 9/2001 | Lai et al. | |
| 6,346,964 B1 | 2/2002 | Rogers et al. | |
| 6,404,745 B1 | 6/2002 | O'Neil et al. | |
| 6,584,077 B1 | 6/2003 | Polomski | |
| 6,757,005 B1 * | 6/2004 | Elbaz et al. | 348/14.09 |
| 2003/0123537 A1 | 7/2003 | Yona et al. | |
| 2004/0008635 A1 * | 1/2004 | Nelson et al. | 370/260 |

FOREIGN PATENT DOCUMENTS
JP    01094786 A  *  4/1989
* cited by examiner

*Primary Examiner* — Melur Ramakrishnaiah
(74) *Attorney, Agent, or Firm* — Oblon, Spivak, McClelland, Maier & Neustadt, L.L.P.

(57) ABSTRACT

A method and apparatus for conferencing dynamically determines conference parameters such as image layout, image resolution and bandwidth. The conference parameters are dynamically determined based on the number of participants or video sources or both that currently connect to the conference. Video signals received from connected sites are processed to provide a composite video signal according to defined conference parameters and the composite video signal is transmitted to the connected sites. Upon one or more other sites connecting to the conference or one or more of the connected sites disconnecting from the conference or both, such that the number of sites or sources currently connected in the conference changes, one or more conference parameters is redefined. The received video signals are processed according to the redefined conference parameters to provide a second composite video signal that is transmitted to the connected sites. The conference parameters include composite image layout, image resolution, and conference bandwidth rate.

9 Claims, 12 Drawing Sheets

PRIOR ART

PRIOR ART

METHOD AND APPARATUS FOR VIDEO CONFERENCING HAVING DYNAMIC PICTURE LAYOUT

RELATED APPLICATION

This application is a continuation of U.S. application Ser. No. 10/601,095, filed Jun. 20, 2003 now U.S. Pat. No. 7,034,860. The entire teachings of the above application are incorporated herein by reference.

BACKGROUND

Video conferencing systems allow for simultaneous exchange of audio, video and data information among multiple conferencing sites. Systems known as multipoint control units (MCUs) perform switching functions to allow multiple sites to intercommunicate in a conference. The MCU links the sites together by receiving frames of conference signals from the sites, processing the received signals, and retransmitting the processed signals to appropriate sites. The conference signals include audio, video, data and control information. In a switched conference, the video signal from one of the conference sites, typically that of the loudest speaker, is broadcast to each of the participants. In a continuous presence conference, video signals from two or more sites are spatially mixed to form a composite video signal for viewing by conference participants. The continuous presence or composite image is a combined picture that may include live video streams, still images, menus or other visual images from participants in the conference.

In a typical continuous presence conference, the video display is divided into a composite layout having areas or regions (e.g., quadrants). Sites are selected at conference setup from the sites connected in the conference for display in the regions. Common composite layouts include four, nine or sixteen regions. The layout is selected and then fixed for the duration of the conference.

Some conference arrangements provide different composite signals or video mix such that each site may view a different mix of sites. Another arrangement uses voice activated quadrant selection to associate sites with particular quadrants. That arrangement enables conference participants to view not only fixed video mix sites, but also a site selected on the basis of voice activity. However, the layout in terms of number of regions or quadrants is fixed for the conference.

SUMMARY

There is a need for a capability for conferencing that enables conference sites to receive composite video signals that present an appropriate or best impression. There is a further need to have the best impression be provided dynamically as the number of conference participants or the number of video sources changes during a conference.

Accordingly, the present approach provides a method and apparatus for conferencing that dynamically determines conference parameters such as image layout, image resolution and bandwidth. According to an aspect of the present approach, the conference parameters are dynamically determined based on the number of video sources or participants currently connected to the conference.

According to a method of the present approach, at least two sites are connected to a conference. At least two video signals are received from the connected sites. One or more conference parameters are defined based on the number of sources or sites connected in the conference. The received video signals are processed to provide a composite video signal according to the defined conference parameters and the composite video signal is transmitted to at least one of the connected sites. Upon one or more other sites or other video sources connecting to the conference or one or more of the connected sites or video sources disconnecting from the conference or both, such that the number of sites or video sources currently connected in the conference changes, one or more conference parameters is redefined. The received video signals are processed according to the redefined conference parameters to provide a second composite video signal that is transmitted to at least one of the connected sites.

The conference parameters include composite image layout, image resolution, and conference bandwidth rate. The composite image layout includes areas or regions, the number of which may depend on the number of currently connected sites. The image resolution may include image formats selected based on image clarity and image motion. The conference bandwidth rate includes defining a standard rate and a low rate depending on the capabilities of the conference sites.

According to an apparatus of the present approach, a multipoint control unit for conferencing includes an interface unit for receiving video signals from at least two sites connected in a conference; a control processor for dynamically defining one or more conference parameters based on the number of sites or video sources connected in the conference; and a video processor for processing the received video signals to provide a composite video signal according to the defined conference parameters.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A video teleconferencing system capable of continuous presence conferencing is described in U.S. Pat. No. 5,600,646, the entire teachings of which are incorporated herein by reference. That system, with certain modifications, is now described briefly herein followed by a description of the continuous presence configuration of the present invention.

Throughout the specification, the term "site" is used to refer collectively to a location having an audiovisual endpoint terminal and a conference participant or user.

Figure 1:
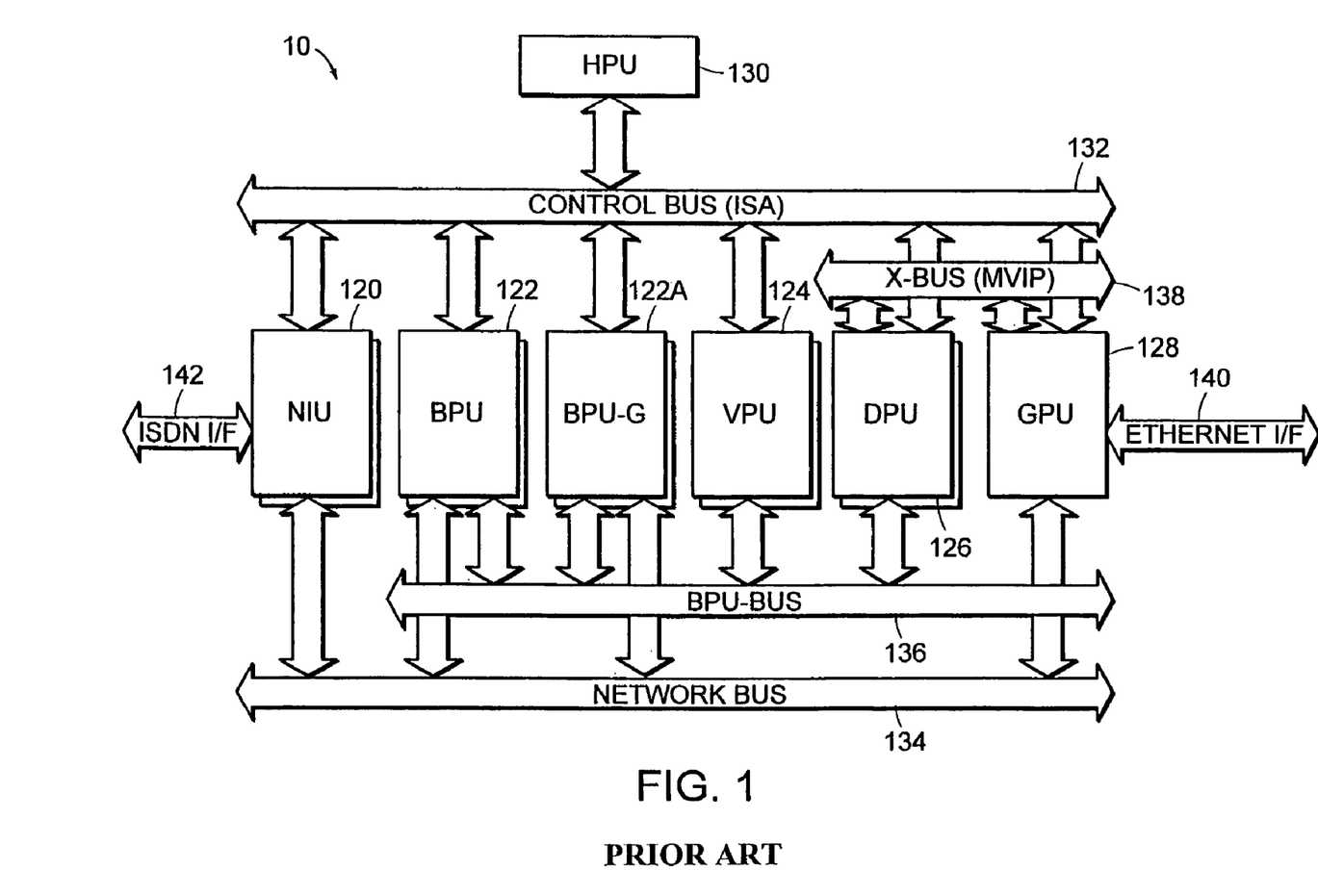
FIG. 1 is a block diagram of an MCU configuration.

Referring now to FIG. 1, there is shown an embodiment of an MCU 10 of the type disclosed in the above-referenced U.S. Pat. No. 5,600,646. The MCU 10 also includes H.323 functionality as disclosed in U.S. Pat. No. 6,404,745 (incorporated herein by reference in its entirety). In addition, video processing in the MCU has been enhanced, as will be described further herein. The features described herein for MCU 10 can be embodied in a Tandberg MCU.

The MCU 10 includes at least one Network Interface Unit (NIU) 120, at least one Bridge Processing Unit (BPU) 122, a Video Processing Unit (VPU) 124, a Data Processing Unit (DPU) 126, and a Host Processing Unit (HPU) 130. In addition to a host Industry Standard Architecture (ISA) control bus 132, the MCU 10 includes a network bus 134, a BPU bus 136 and an X-bus 138. The network bus 134 complies with the Multi-Vendor Integration Protocol (MVIP) while the BPU bus 136 and the X-bus are derivatives of the MVIP specification. The HPU 130 provides a management interface for MCU operations. Each of the foregoing MCU elements is further described in the above-referenced U.S. Pat. Nos. 5,600,646 and 6,404,745.

The H.323 functionality is provided by the addition of a Gateway Processing Unit (GPU) 128 and a modified BPU referred to as a BPU-G 122A. The GPU 128 runs H.323 protocols for call signaling and the creation and control of audio, video and data streams through an Ethernet or other LAN interface 140 to endpoint terminals. The BPU-G 122A is a BPU 122 that is programmed to process audio, video and data packets received from the GPU 128.

The MCU operation is now described at a high-level, initially for circuit-based conferencing and then for packet-based H.323 conferencing. In circuit-based conferencing, digital data frames from H.320 circuit-based endpoint terminals are made available on the network bus 134 through a network interface 142 to an NIU 120. The BPUs 122 process the data frames from the network bus 134 to produce data frames which are made available to other BPUs 122 on the BPU bus 136. The BPUs 122 also extract audio information from the data frames. The audio information is decoded to PCM data and made available on the BPU bus 136 for mixing with audio from other H.320 terminals by respective BPUs 122 in a conference. The BPUs 122 combine compressed video information and mixed encoded audio information into frames that are placed on the network bus 134 for transmission to respective H.320 terminals.

In a standard conference, the BPUs 122 perform video switching within a conference by selecting video data frames from timeslots on the BPU bus 136 and routing the frames to respective terminals in the conference. A particular BPU 122 selects the appropriate video data frames based upon a conference selection process. Typically, the selection process is based upon a comparison of the voice levels of the conference sites. The loudest conference site is designated the current broadcaster to be viewed by all other conference locations while the current broadcaster typically views another site. In other conference selection processes, an MCU operator or a particular audiovisual terminal operating in a chair control mode selects a site as the current broadcaster.

In cases where the audiovisual terminals operate at different transmission rates or with different compression algorithms or are to be mixed into a composite image, multiple video inputs are sent to the VPU 124 where the video inputs are decompressed, mixed and recompressed into a single video stream. This single video stream is then passed back through the BPU 122 which switches the video stream to the appropriate endpoint terminals.

For packet-based H.323 conferencing, the GPU 128 makes audio, video and data packets available on the network bus 134. The data packets are processed through the DPU 126. The BPU-G 122A processes audio and video packets from the network bus 134 to produce audio and video broadcast mixes which are placed on the network bus 134 for transmission to respective endpoint terminals through the GPU 128. In addition, the BPU-G 122A processes audio and video packets to produce data frames which are made available to the BPUs 122 on the BPU bus 136. In this manner, the MCU 14 serves a gateway function whereby regular BPUs 122 and the BPU-G 122A can exchange audio and video between H.320 and H.323 terminals transparently.

Figure 2:
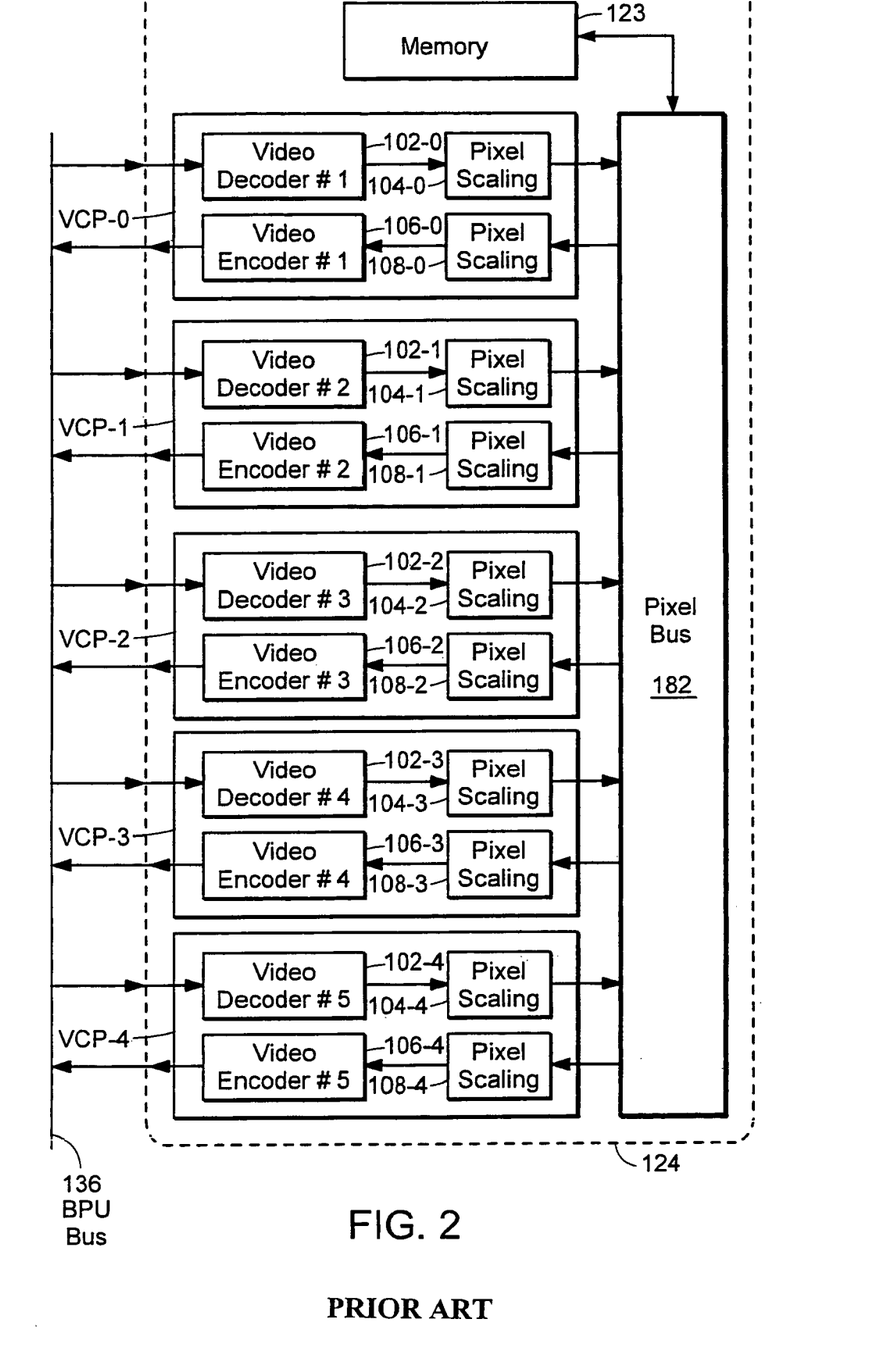
FIG. 2 is a schematic block diagram of an embodiment of a VPU.

Having described the components of the MCU 10 that enable the basic conference bridging functions, a high level description of the flexibility provided by the VPU 124 is now described with reference to the functional block diagram of FIG. 2. In the MCU 10, compressed video information from up to five audiovisual terminals that are in the same conference are routed to a particular VPU 124 over the BPU bus 136. The VPU 124 comprises five video compression processors (VCP0-VCP4), each having a video decoder/encoder pair 102-$i$, 106-$i$, and pixel scaling blocks 104-$i$, 108-$i$.

A video decoder/encoder pair 102-$i$, 106-$i$ is assigned to the compressed video information stream associated with each particular site in the conference. Each video decoder 102-$i$ decodes the compressed video information using the algorithm that matches the encoding algorithm of its associated site. Included as part of the video decoder 102-$i$ may be the processing to determine the framing, packets, and checksums that may be part of the transmission protocol. It should be noted that a processor encoded video stream can be assigned to multiple sites (e.g., a continuous presence application having more than five sites in the conference). In addition, a decoder/encoder pair 102-$i$, 106-$i$ can switch among the sites within a conference.

The decoded video information (e.g., pixels) is scaled up or down, if necessary, by a pixel scaling block 104-$i$ to match the pixel resolution requirements of other sites in the conference that will be encoding the scaled pixels. For example, a desktop system may encode at a resolution of 256×240 pixels while an H.320 terminal may require a pixel resolution of 352×288 pixels for a Common Intermediate Format (CIF) image. Other common formats include Quarter Common Intermediate Format (QCIF) (176×144 pixels), 4CIF (704×576), SIF (352×240), 4SIF (704×480), VGA (640×480), SVGA (800×600) and XGA (1024×768).

The VPU 124 includes a pixel bus 182 and memory 123. The system disclosed in U.S. Pat. No. 5,600,646 uses a time division multiplex bus. In the embodiment disclosed herein, the pixel data is not identified and separated by time slots on pixel bus 182. Rather, the decoded pixels from each video source are temporarily stored in memory 123 (addressable RAM). Thus, instead of fetching pixel data by reading from the bus at certain time slots reserved for the respective inputs as disclosed in the '646 patent, the RAM is addressed to read out the pixel data of interest onto the bus at the time the data is needed.

In particular, each decoder 102-$j$ outputs pixels onto pixel bus 182 to memory 123. Each encoder 106-$j$ may retrieve any of the images from the memory 123 on the pixel bus for re-encoding and/or spatial mixing or compositing. Another pixel scaling block 108-$j$ is coupled between the pixel bus 182 and the encoder 106-$j$ for adjusting the pixel resolution of the sampled image as needed.

Figure 3:
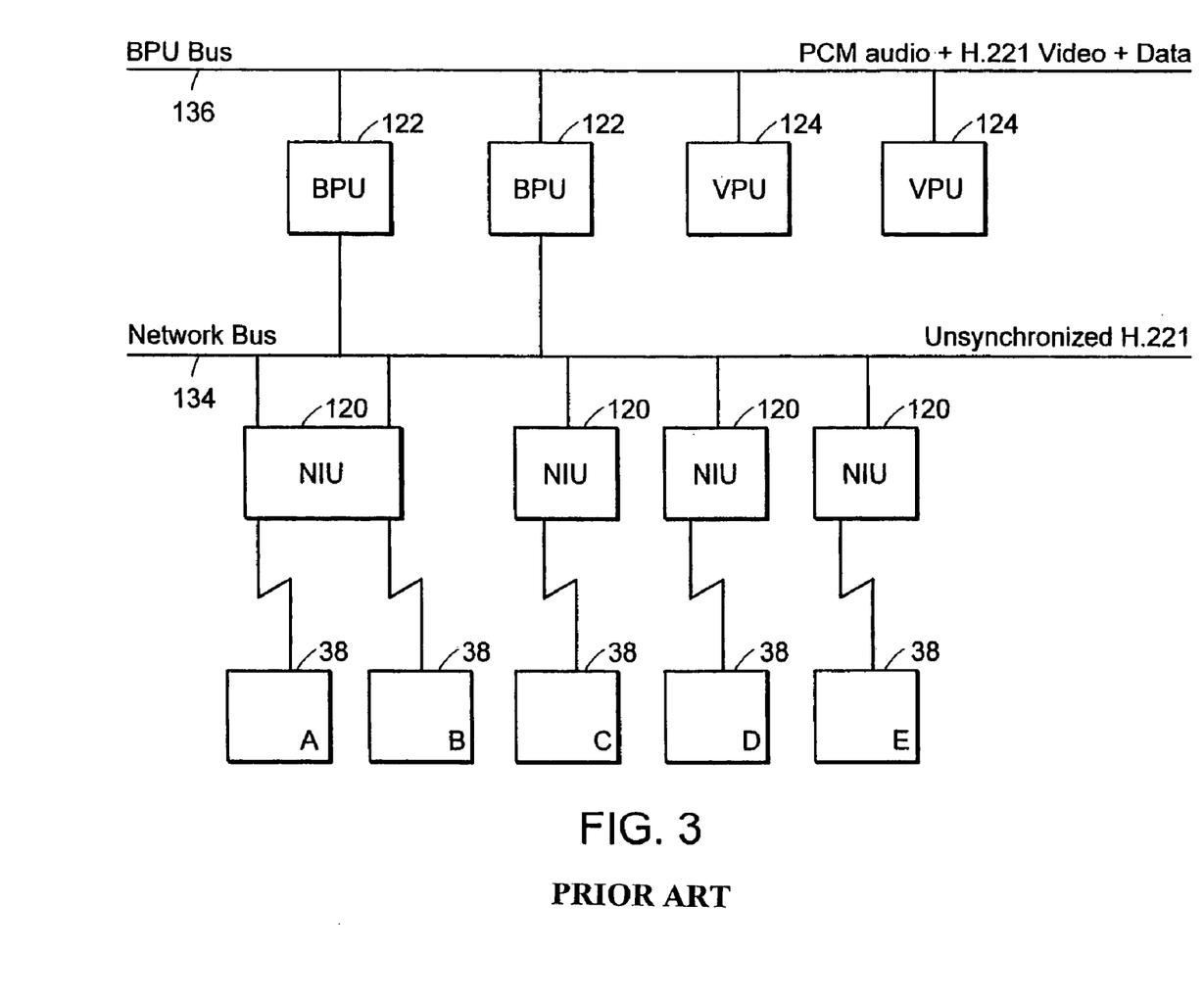
FIG. 3 is a block diagram of an MCU configuration illustrating data flow for continuous presence conferencing.
Figure 4:
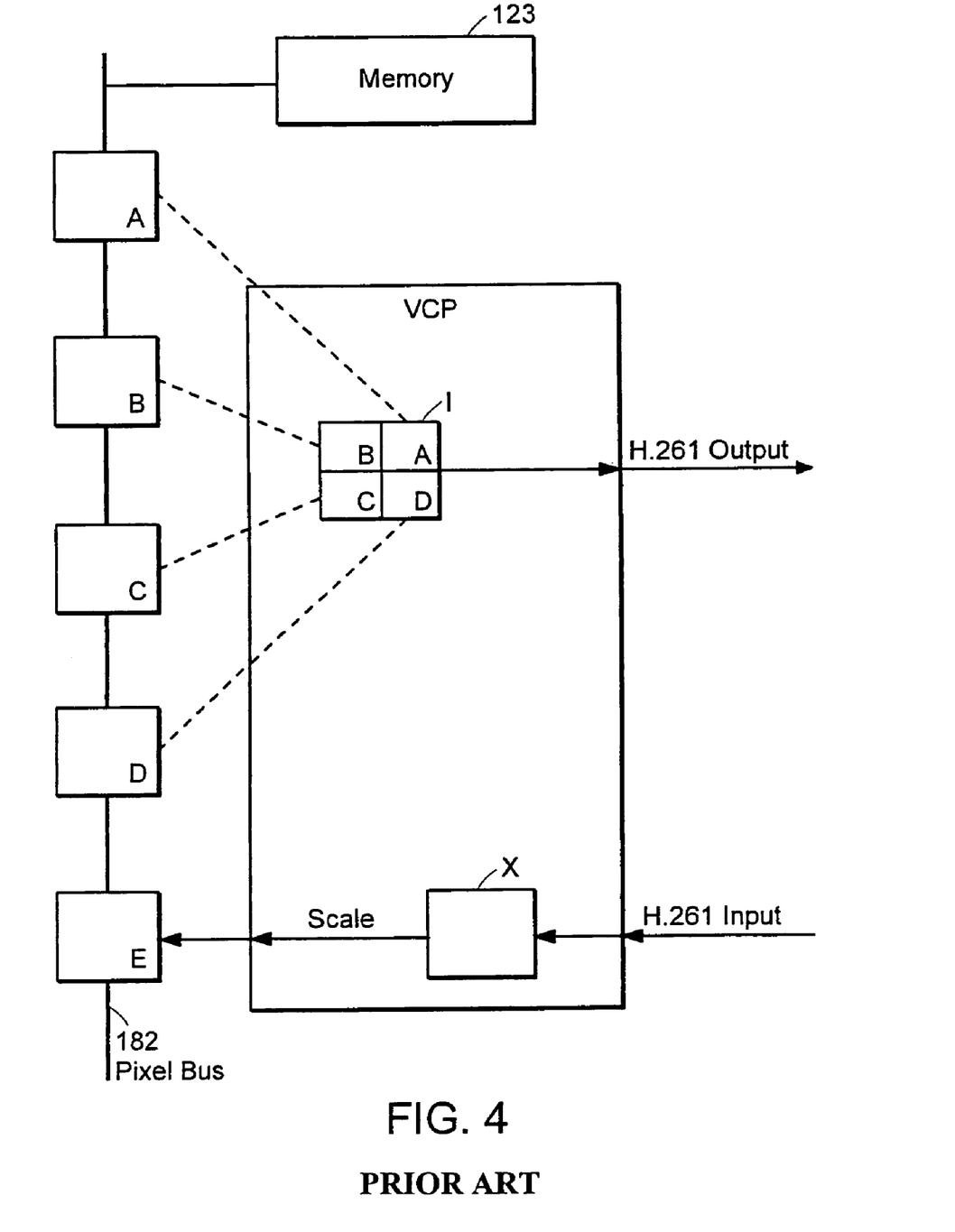
FIG. 4 is a block diagram illustrating image tiling in a continuous presence conference.

A continuous presence application is now described with reference to FIGS. 3 and 4. For simplicity the endpoint terminals as shown are H.320 terminals. In FIG. 3, data from sites 38 arrive over a communications network to respective NIUs 120. Five sites 38 (A, B, C, D, E) are connected in the conference. Sites A and B are shown connected to a particular NIU 120 which supports multiple codec connections (e.g., a T1 interface). The other sites C, D, and E connect to NIUs 120 supporting only a single codec connection (e.g., an ISDN interface). Each site 38 places one or more octets of digital data onto the network bus 134 as unsynchronized H.221 framed data. The BPUs 122 then determine the H.221 framing and octet alignment. This aligned data is made available to all other units on the BPU bus 136. The BPUs 122 also extract audio information from the H.221 frames and decode the audio into 16 bit PCM data. The decoded audio data is made available on the BPU bus 136 for mixing with audio data from other conference sites.

Aligned H.221 frames are received by the VPU 124 for processing by encoder/decoder elements called video compression processors (VCPs). The VPU 124 has five VCPs (FIG. 2) which in this example are respectively assigned to sites A, B, C, D, E. A VCP on the VPU 124 which is assigned to site E is functionally illustrated in FIG. 4. Compressed video information (H.261) is extracted from the H.221 frames and decoded by the VCP as image X. The decoder video image X is placed on the pixel bus 182 through a scaling block. FIG. 4 shows the pixel bus 182 with decoded video frames from each site A, B, C, D, E successively retrieved from memory 123 identified by their respective RAM addresses. The VCP assigned to site E receives the decoded video frames from sites A, B, C and D which are then tiled (spatially mixed) into a single composite image I. The tiled image I is then encoded as H.261 video within H.221 framing and placed on the BPU bus 136 (FIG. 3) for BPU processing as described above.

A similar process can be used to provide transcoding for sites that use different bandwidths. In particular, U.S. Pat. No. 5,600,646 discloses bandwidth transcoding, also referred to as rate matching. Taking into account the embodiment described above for an MCU having a VPU configured with memory accessible across a pixel bus, the processing is similar as described therein.

Having described an embodiment of a video conferencing system capable of continuous presence conferencing, an improved continuous presence capability of the present invention is now described which provides dynamic conference parameters, including picture layout, transcoding and bandwidth, based on the number of sites connected to a conference.

As noted, a limitation associated with conventional continuous presence applications is that the picture layout is fixed during the conference even if participants enter or leave. Typically, the screen split (e.g., 4-way, 9-way, 16-way) and the positions of the views of the respective participants are set up manually or randomly at initiation of the conference. This can result in an inconvenient layout, format and/or resolution. The present approach allows an MCU operating in continuous presence mode to automatically select the "best impression" for viewing at the endpoint sites without requiring any user intervention. The best impression includes appropriate or ideal picture layout, resolution and bandwidth. The selection is made according to procedures that take into account the number of participant in the conference and the capabilities of the endpoint terminals.

Three aspects of the present approach include dynamic layout switching, dynamic resolution switching, and dynamic video transcoding. Each of these aspects is now described in further detail.

Regarding dynamic layout switching, the MCU adjusts the picture layout according to the following procedures. With one or two participants, the MCU processes the video signals from the participants to display a picture layout with full screen showing each participant. In another embodiment, the MCU can use a picture layout having a 2/N split where for N=4, the screen contains two pictures at the same size as if the whole screen was filled with four equally sized pictures (4/4 split). Note that the parts of the screen not covered with a picture may be filled with a background color, logo or other image.

Figure 5A:
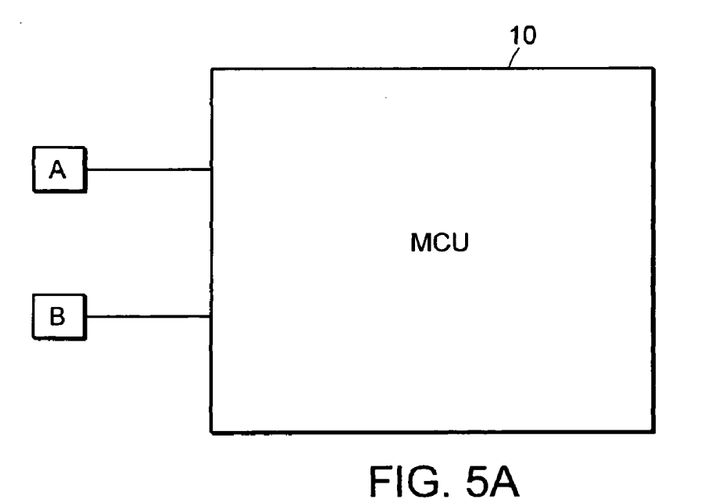
FIG. 5A is a diagram illustrating a conference arrangement with two connected sites.
Figure 5B:
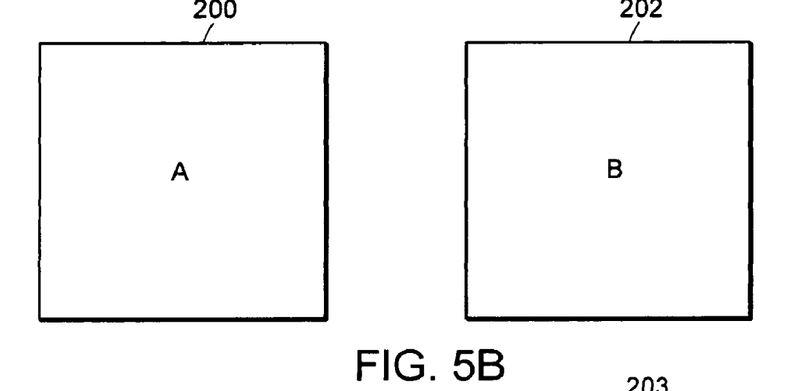
FIG. 5B illustrates images transmitted to the sites in FIG. 5A.
Figure 5C:
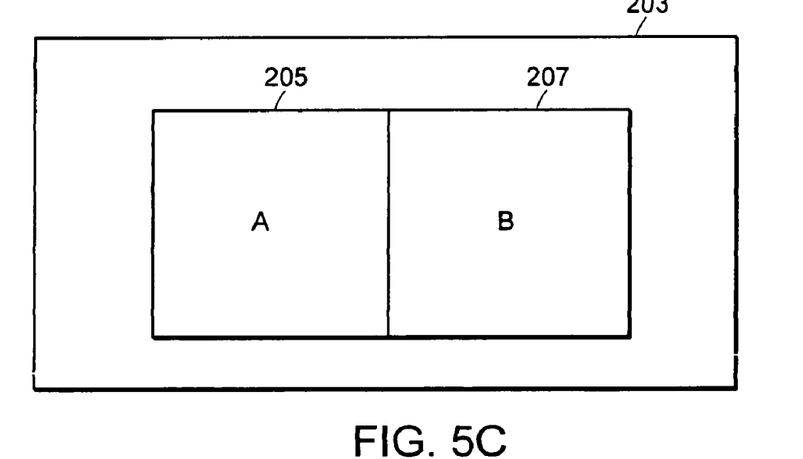
FIG. 5C illustrates another image layout for the conference arrangement of FIG. 5A.

FIG. 5A shows an example of two participants (sites A and B) connected to an MCU. FIG. 5B shows the images 200, 202 that are displayed with full screen picture layout at the respective sites B and A. FIG. 5C shows an example of a 2/4 split layout with a common image 203 displayed at both sites. In this case, the image from site A is located in region 205 and the image from site B is located in region 207.

Figure 6A:
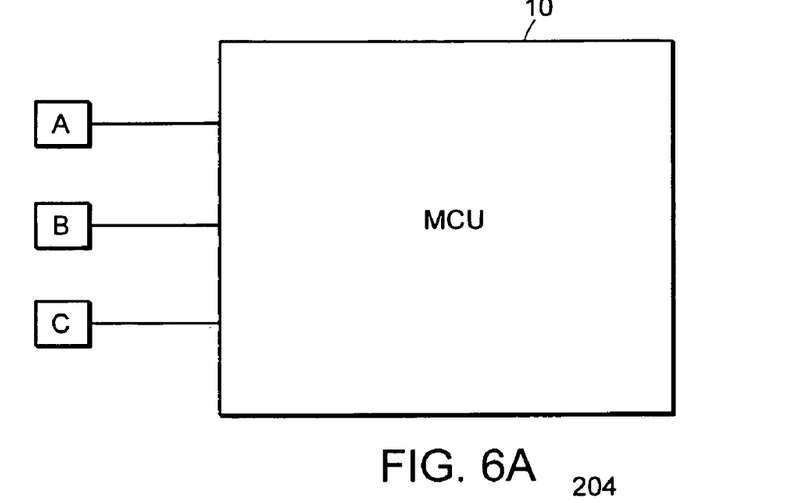
FIG. 6A is a diagram illustrating a conference arrangement with three connected sites.
Figure 6B:
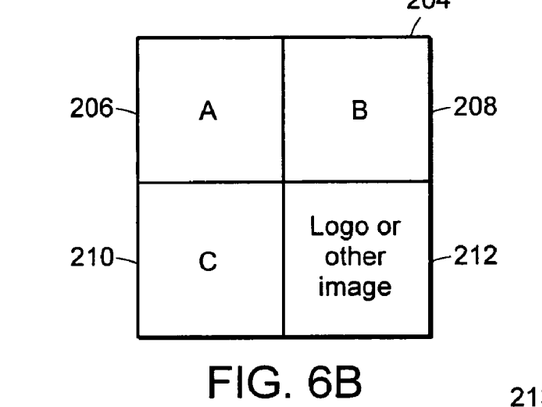
FIG. 6B illustrates an image layout for the conference arrangement of FIG. 6A.

When more participants join the conference, the MCU may automatically change the picture layout to display more participants, depending on the number of participants now connected in the conference. FIG. 6A shows an example in which three participants (sites A, B, C) are joined in the conference. In this case, a four region or quadrant image layout, referred to as CP4, is selected to form the image 204 shown in FIG. 6B. In the particular 3/4 split layout shown, the image from site A is located in quadrant 206, the image from site B is located in quadrant 208 and the image from site C is located in quadrant 210. Quadrant 212 contains a logo, background color or other image. If a fourth site next joins the conference, the layout remains the same except that the image from the fourth site is placed in quadrant 212.

Figure 6C:
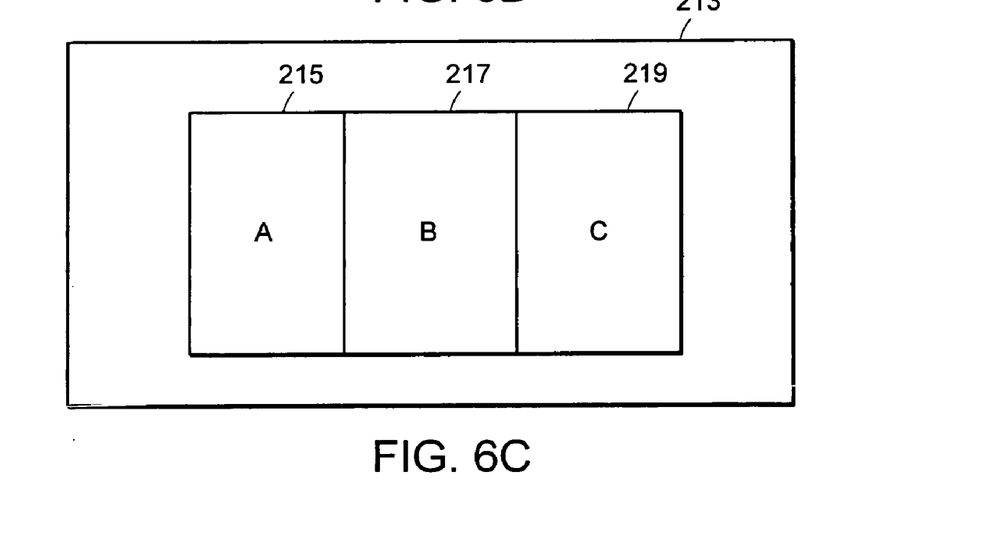
FIG. 6C illustrates another image layout for the conference arrangement of FIG. 6A.

Note that other layouts can be used to handle the three participants, such as a 3/3 split image layout forming the image 213 shown in FIG. 6C. For the image 213, the image from site A is located in region 215, the image from site B is located in region 217 and the image from site C is located in region 219.

Figure 7A:
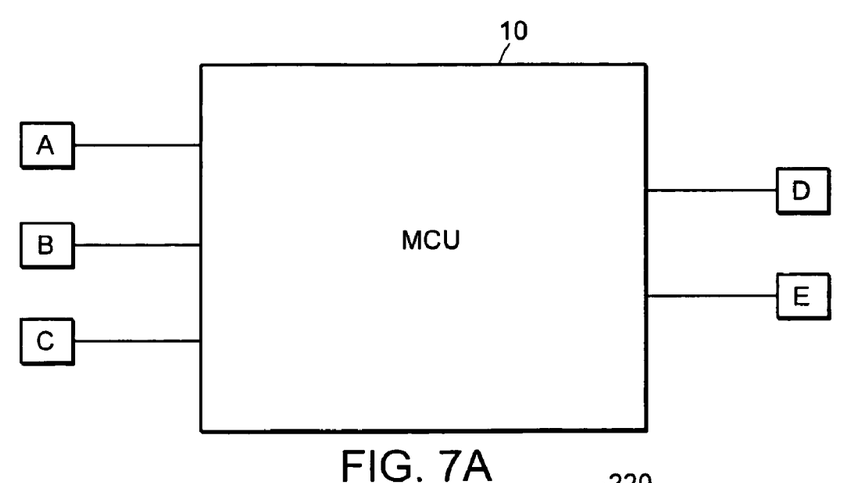
FIG. 7A is a diagram illustrating a conference arrangement with five connected sites.
Figure 7B:
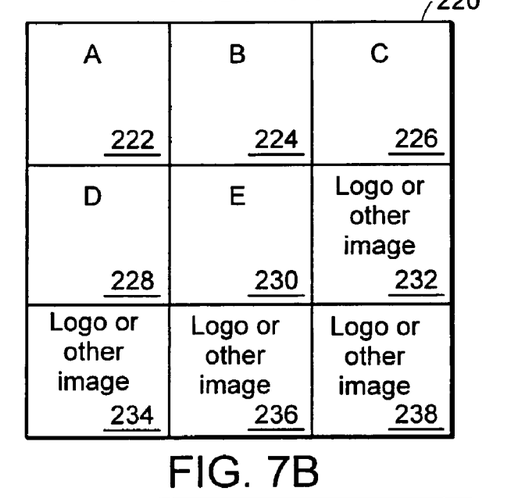
FIG. 7B illustrates an image layout for the conference arrangement of FIG. 7A.

In the case in which five participants are now included in the conference, the MCU again dynamically changes the picture layout to select the best impression. FIG. 7A shows five participants (sites A, B, C, D, E) connected in a conference. For this case a nine region image layout, referred to as CP9, is selected to form image 220 shown in FIG. 7B. In the CP9 layout, the images from sites A, B, C, D and E are located in respective regions 222, 224, 226, 228 and 230. The remaining regions 232, 234, 236 and 238 contain a logo, background color or other image.

Figure 7C:
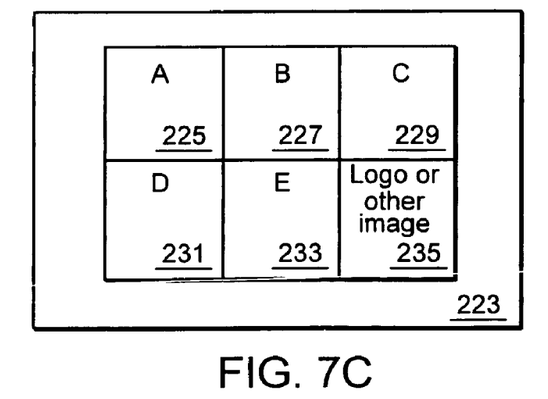
FIG. 7C illustrates another image layout for the conference arrangement of FIG. 7A.

Another layout for handling the five participants is the 5/6 split image layout that forms image 223 shown in FIG. 7C. In this case, images from sites A to E are located in respective regions 225, 227, 229, 231 and 233. Region 235 contains a logo, background color or other image.

Figure 8A:
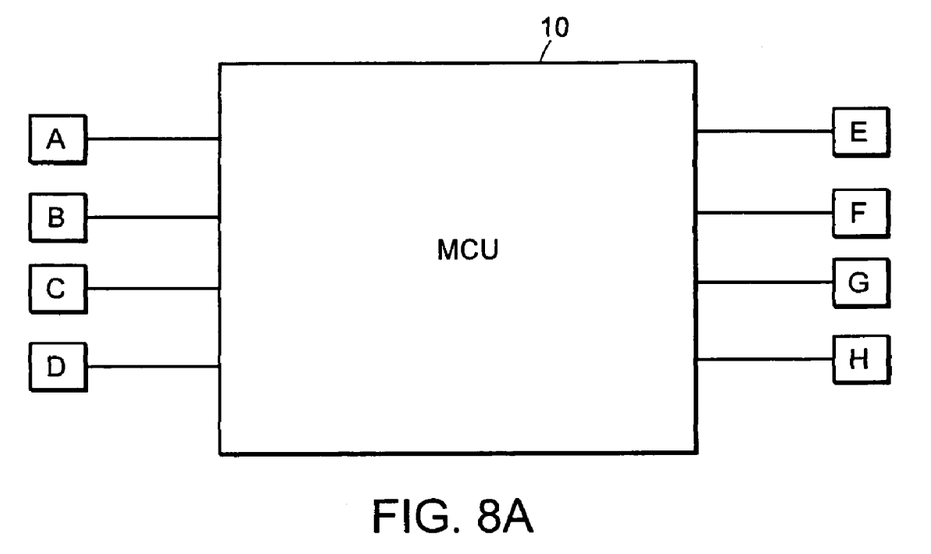
FIG. 8A is a diagram illustrating a conference arrangement with eight connected sites.
Figure 8B:
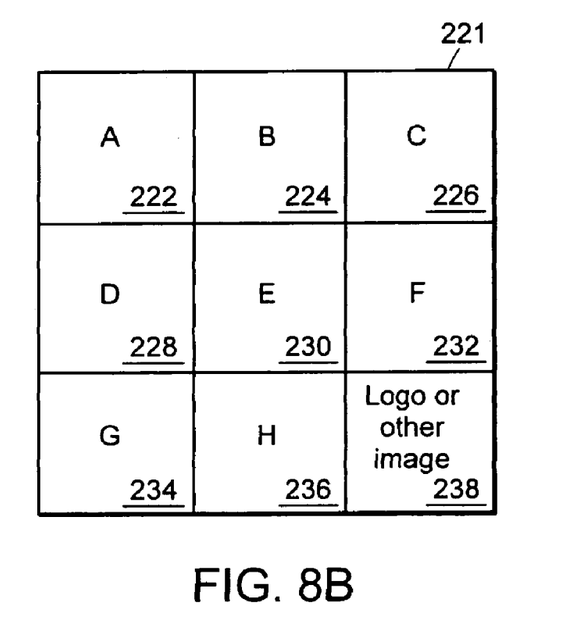
FIG. 8B illustrates an image layout for the conference arrangement of FIG. 8A.

Upon three additional participants (sites F, G, H) being added to the conference, the conference now includes eight participants (sites A, B, C, D, E, F, G, H) as shown in FIG. 8A. In this case, the MCU keeps the CP9 picture layout to provide the best impression, forming image 221 shown in FIG. 8B. In the CP9 layout, the images from sites A, B, C, D and E are again located in respective regions 222, 224, 226, 228 and 230. Sites F, G and H are located in respective regions 232, 234 and 236. The remaining region 238 contains a logo, background color or other image.

Figure 9A:
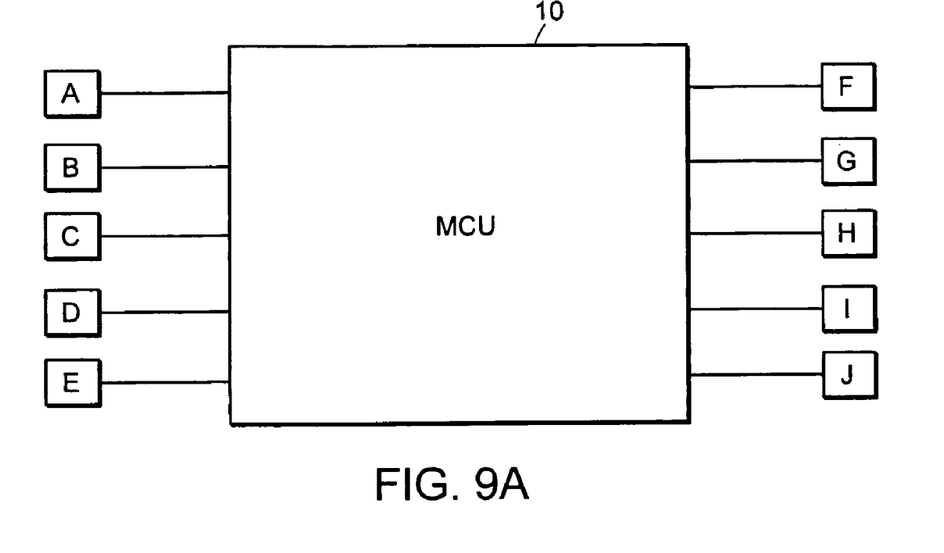
FIG. 9A is a diagram illustrating a conference arrangement with ten connected sites.
Figure 9B:
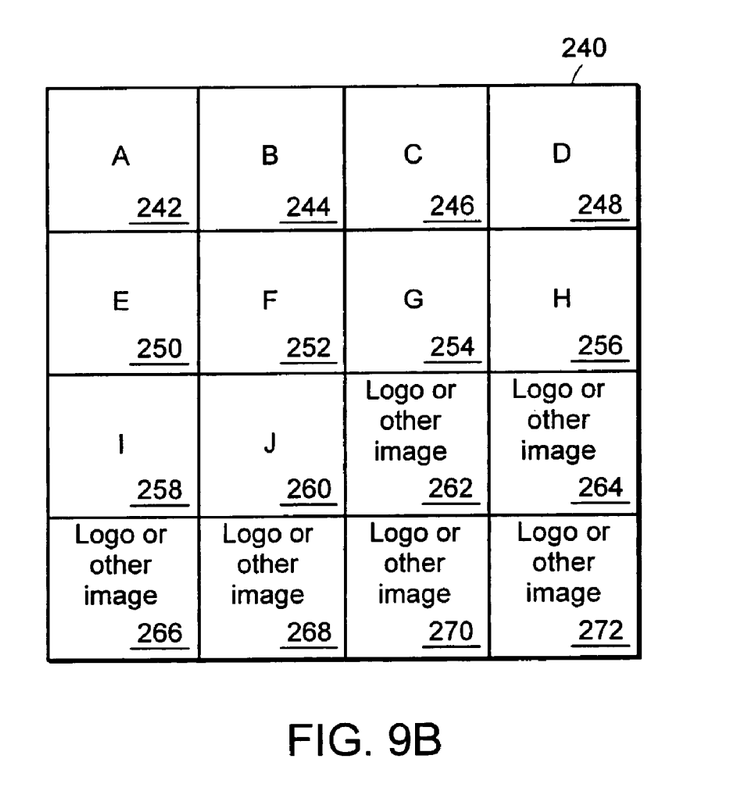
FIG. 9B illustrates an image layout for the conference arrangement of FIG. 9A.

With the addition of two more participants (sites I and J), the conference now includes ten participants (sites A, B, C, D, E, F, G, H, I, J) as shown in FIG. 9A. The MCU again dynamically changes the picture layout to select the best impression. For this case a sixteen region image layout, referred to as CP16, is selected to form image 240 shown in FIG. 9B. In the CP16 layout, the images from sites A, B, C, D, E, F, G, H, I, J are located in respective regions 242, 244, 246, 248, 250, 252, 254, 256, 258 and 260. The remaining regions 262, 264, 266, 268, 270 and 272 contain a logo, background color or other image. These remaining regions can be used to accommodate the images of up to six additional participants. For conferences having more than 16 participants using a CP16 layout, the MCU selects which sites to display from among the participants using random selection, voice loudness, or other criteria.

As described, the MCU can be configured to support any number of picture layouts, with the MCU automatically changing between these layouts as the number of participants increases or decreases as sites are added or disconnected from an active conference. Note that while the foregoing has shown image layouts in which the regions are contiguous, other layouts can be used in which the regions are non-contiguous. In a particular embodiment, the MCU is configured to support the following picture layouts: full screen showing one participant only, CP4 showing four participants, CP9 showing nine participants, and CP16 showing sixteen participants. The table below shows a possible mapping between the number of participating sites and/or video sources and a selected picture layout.

| Number of sites or video sources in conference | Picture layout |
| --- | --- |
| 1 or 2 | Full screen |
| 3 or 4 | CP4 |
| 5 to 9 | CP9 |
| Greater than 9 | CP16 |

Figure 10:
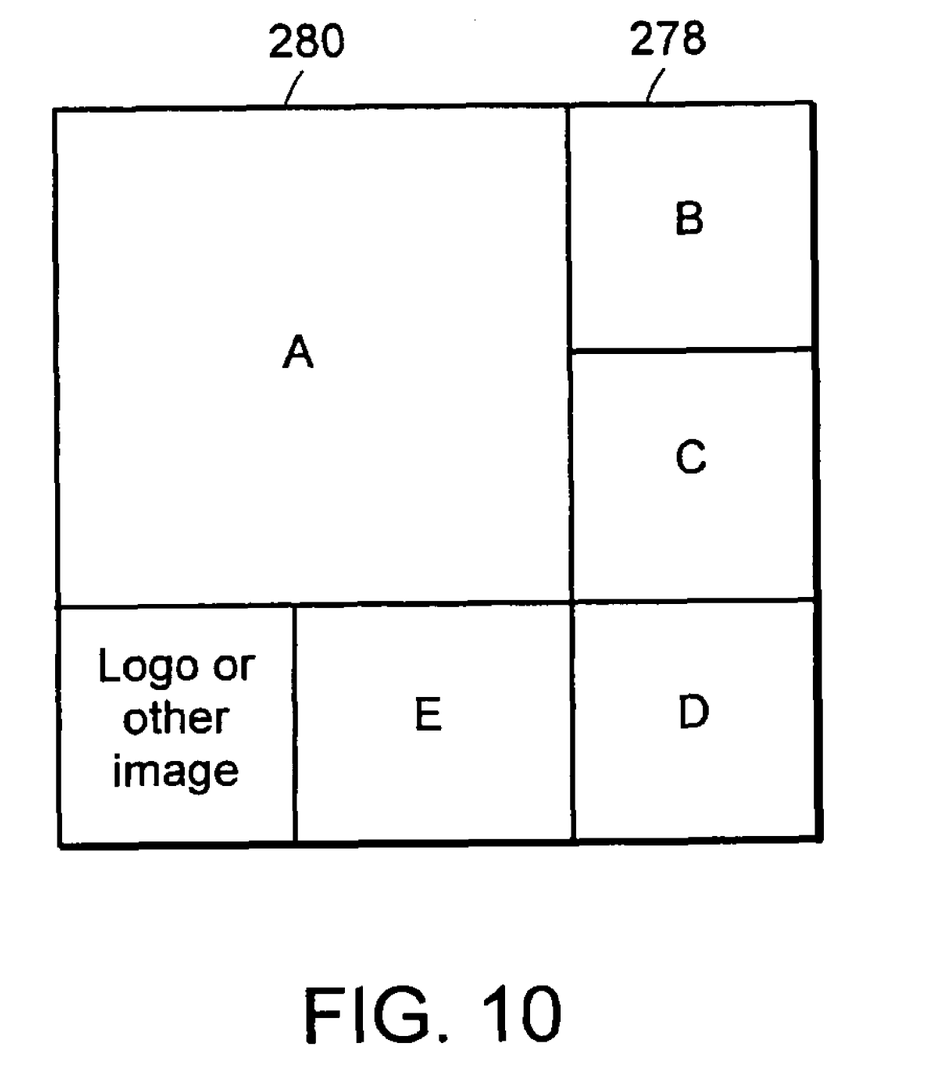
FIG. 10 illustrates another image layout for the conference arrangement of FIG. 7A.

Note that while the foregoing has shown image layouts in which the regions are of the same size, other layouts can be used in which the size of the regions varies. As an example, one layout 278 could be similar to the CP9 layout, except that one main picture, e.g., showing the present speaker, occupies four regions 280 of the nine regions. This picture layout is shown in FIG. 10 for a conference of five sites corresponding to the conference shown in FIG. 7A.

Figure 11A:
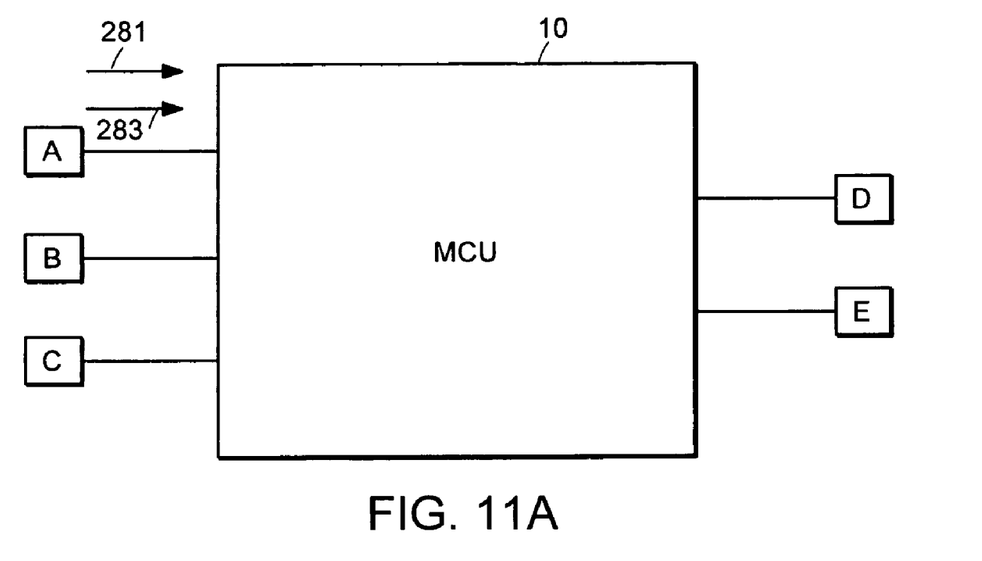
FIG. 11A illustrates a conference arrangement with five connected sites, one of which provides two video signals.
Figure 11B:
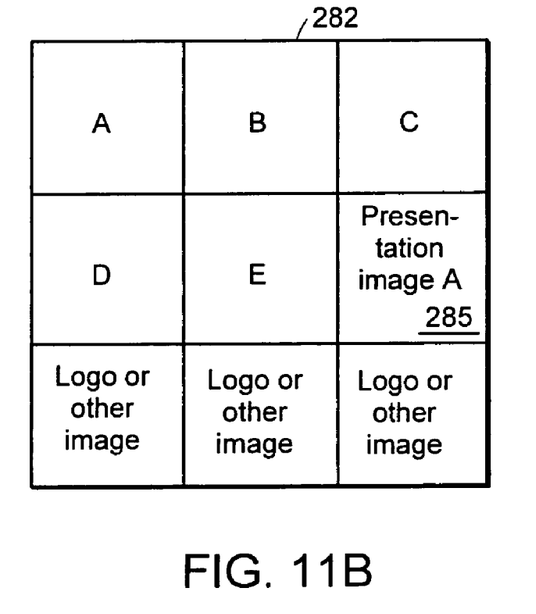
FIG. 11B illustrates an image layout for the conference arrangement of FIG. 11A.

Further, the participants or sites are not limited to transmit only one single video signal. One site may e.g., transmit one video signal from a camera representing a picture of a presenter, and another video signal from a PC representing data from a presentation application (e.g., PowerPoint). Thus, the picture layout can depend on the number of video signals or sources rather than the number of participants. FIGS. 11A and 11B provide a configuration and picture layout that illustrate this feature for a conference of five sites. Note that site A provides two video signals, one signal 281 that corresponds to the participant at site A and another signal 283 that corresponds to a presentation. The picture layout in FIG. 11B is arranged to include the video signals from sites A, B, C, D and E plus the video signal for the presentation from site A at 285. Note that other layouts can be used and that the dynamic aspect described above with respect to additions or removals of sites from the conference applies as well to addition or removal of other video signals such as the presentation signal from site A.

To form the images shown in any of the continuous presence layouts described above, the composite image can be processed from the video signals received from the sites as described above with respect to FIGS. 1 to 4 of the MCU embodiment. A process for controlling the dynamic picture layout selection is shown in the example control flow diagram of FIG. 12. In this example, a conference has between one and five participants at different points during the operation of the conference. Steps 300 through 324 relate to changes that occur in the conference due to sites being added, while steps 326 through 340 relate to changes that occur due to sites disconnecting from the conference.

At step 300, the conference starts from a conference state of zero sites connected. At 302, a first site (site 1) connects to the conference and at 304 is provided with a video signal of its own video image (denoted "site1Tosite1") using a video mode referred to as "selfview". At 306 the conference state is one site connected. A second site (site 2) is connected to the conference at 308. At 310, using a video mode referred to as "voice switched", each of sites 1 and 2 receives a video signal of the other site (denoted "siteXTositeY"). This video image corresponds to the images 200, 202 shown in FIG. 5B. Referring again to FIG. 12, at 312 the conference state is two sites connected.

A third site (site 3) joins the conference at 314. With three sites in the conference, a CP4 image layout is selected for forming a composite image that includes image data from each of the three sites. The composite image (denoted herein as "CpPictureTo_AllSites") is sent to all three sites at 316 and corresponds to the image 204 shown in FIG. 6B. Referring again to FIG. 12, the conference state at 318 is then three sites connected.

Figure 12:
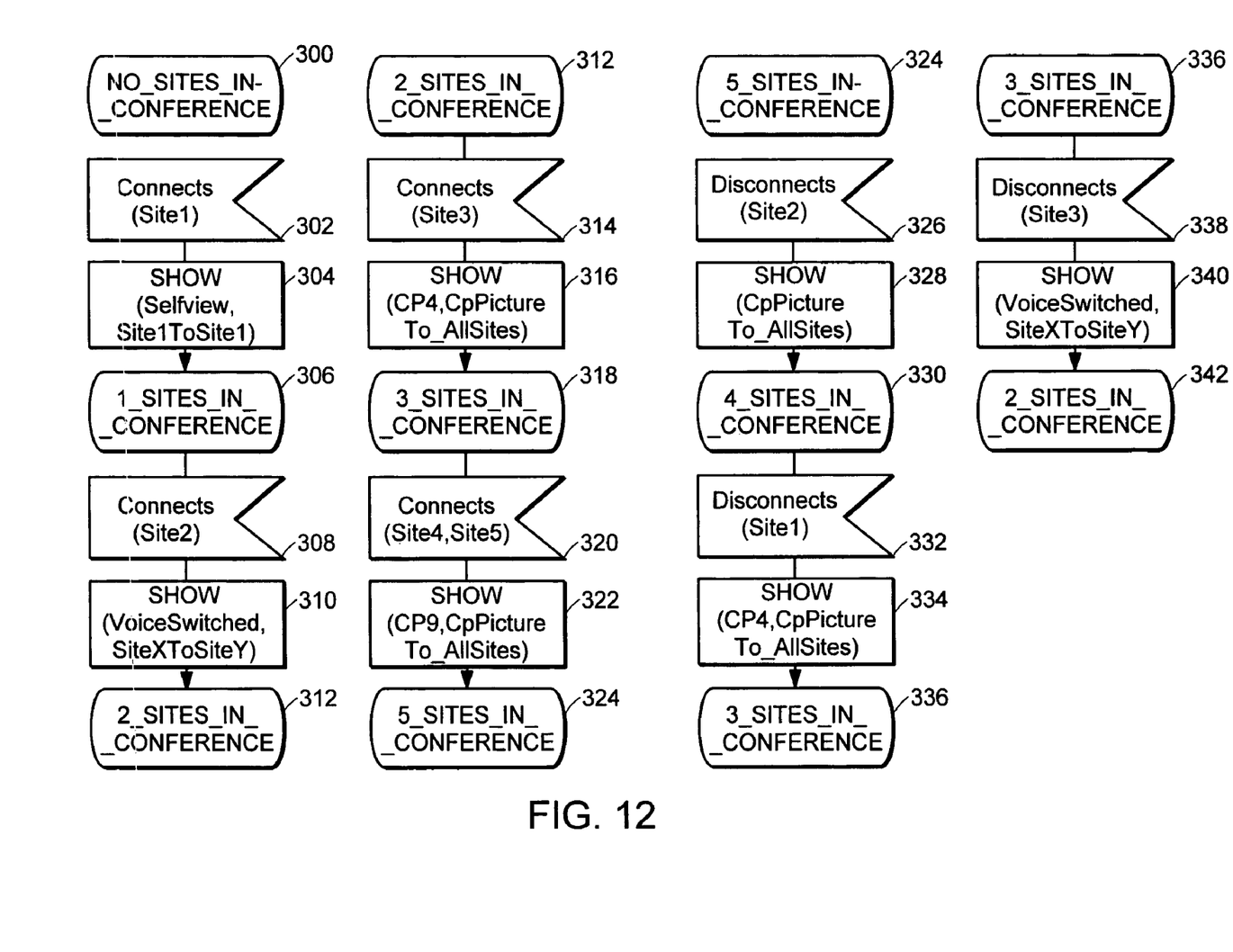
FIG. 12 illustrates a flow diagram associated with control of video processing in accordance with the present approach.

At 320, two additional sites (sites 4 and 5) are connected to the conference. A CP9 image layout is selected to form a composite image that includes image data from each of the five sites. The composite image is sent to all five sites at 322, and the conference state at 324 is now five sites connected. The composite CP9 image corresponds to the image 220 shown in FIG. 7B.

At step 326, site 2 disconnects from the conference. Since there are now only four sites (sites 1, 2, 3 and 5) remaining in the conference, at 328 a CP4 image layout is selected and a composite image is sent to the four remaining sites. At 330, the conference state is four sites connected.

At 332, site 1 disconnects from the conference. Since there are now only three sites (sites 2, 3 and 5) remaining in the conference, the CP4 image layout is again used and a composite image is sent to the three remaining sites at 334. At 336, the conference state is three sites connected.

At 338, site 3 disconnects from the conference. With only two sites (site 2 and site 5) remaining, the conference mode switches back to voice switched, wherein each of sites 2 and 5 receive a video signal of the other site at 340. At 342 the conference state is two sites connected in the conference.

Regarding automatic resolution switching, the present approach provides automatic determination of the best possible video format transmitted from the MCU to the respective sites dependent on the number of participants included in the CP picture and the capabilities of the respective participants. As an example, in a CP16 and CP9 picture, clarity may be prioritized over correct representation of movements. Thus, a 4CIF resolution is selected as the format transmitted to the sites if they are capable of receiving it, because 4CIF is more suitable for a clear representation than e.g., CIF. However, in the case of a CP4 picture, a CIF resolution format is selected for a better representation of movements at the sacrifice of clarity. Note that if an endpoint site is not capable of receiving the preferred format, the transmitted format can fall back to a reserve format for that particular preferred format.

Regarding video transcoding, the present approach provides support for video transcoding of a limited number of bandwidths. Because of processing limitations, many MCUs support e.g., only two contemporary bandwidths in the same conference call. However, the two bandwidths do not have to be fixed. Thus, the MCU of the present approach defines the two bandwidths according to a highest "standard" and a lowest "low" bandwidth when the conference is initiated. According to the present approach, the two bandwidths can vary according to an optimal choice dependent on the situation. For example, if all participants are connected at 384 kbps and another participant joins the conference at 128 kbps, the standard bandwidth is set to 384 kbps, and the low bandwidth is set to 128 kbps. The video rate of the 384 kbps participants is still set at 384 kbps. However, the new participant receives video at 128 kbps by means of rate transcoding. Subsequent endpoints connected on lower rates than the standard rate will receive video encoded at the low rate of 128 kbps. But, if an endpoint is connected on less than 64 kbps (or another constant) below the standard rate, the standard video rate will be decreased to that rate. In this way, instead of substantially decreasing the bit rate of a new site if it has a bit rate just below the standard bit rate, the standard bit rate is adjusted to the bit rate of the new site.

Thus, while the bandwidths are set according to the bandwidth capabilities of the participants as a whole, the currently available bandwidths for the conference may change when a participant enters or leaves the conference. In other words, even if the allowed number of bandwidths is fixed (e.g., due to limited processing resources in the MCU), the actual bandwidths being used may vary to optimize the utilization of the endpoint's capabilities.

Those skilled in the art should readily appreciate that the present conferencing approach described herein is deliverable to a computer in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software entity executable by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of conferencing comprising:
connecting three or more sites to a conference; receiving video signals from the connected sites;
processing the received video signals to provide a composite video signal according to a defined composite image layout based on the number of sites connected in the conference or the number of received video signals or both;
transmitting the composite video signal to at least one of the connected sites;
upon at least one of the connected sites or at least one video signal disconnecting from the conference or at least one other site or at least one other video signal connecting to the conference, redefining the composite image layout based on the number of sites currently connected in the conference or the number of video signals currently being received;
processing the received video signals to provide a second composite video signal according to the redefined composite image layout; and
transmitting the second composite video signal to at least one of the connected sites.

2. The method of claim 1, wherein the redefining the composite image layout includes defining a layout that has four areas for a conference having four or fewer received video signals.

3. The method of claim 1, wherein the redefining the composite image layout includes defining a layout that has nine areas for a conference having between five and nine received video signals.

4. The method of claim 1 wherein the redefining the composite image layout includes defining a layout that has sixteen areas for a conference having greater than nine received video signals.

5. The method of claim 1, wherein the steps are each implemented with a multipoint control unit.

6. A multipoint control unit for conferencing, the multipoint control unit comprising:
an interface unit that receives video signals from at least two sites connected in a conference;
a control processor that, upon at least one of the connected sites or at least one video signal disconnecting from the conference or at least one other site or at least one other video signal connecting to the conference, redefining image resolution based on at least one of the number of sites currently connected in the conference and the number of video signals currently received; and a video processor for processing the received video signals to provide a composite video signal according to the redefined image resolution.

7. The multipoint control unit of claim 6, wherein the control processor defines the image resolution by selecting a highest common image format for image clarity.

8. The multipoint control unit of claim 6, wherein the control processor defines the image resolution by selecting a highest common image format for image motion.

9. A non-transitory computer readable medium encoded with instructions, which when executed by a computer causes the computer to implement a method of conferencing comprising:

connecting three or more sites to a conference; receiving video signals from the connected sites;

processing the received video signals to provide a composite video signal according to a defined composite image layout based on the number of sites connected in the conference or the number of received video signals or both;

transmitting the composite video signal to at least one of the connected sites;

upon at least one of the connected sites or at least one video signal disconnecting from the conference or at least one other site or at least one other video signal connecting to the conference, redefining the composite image layout based on the number of sites currently connected in the conference or the number of video signals currently being received;

processing the received video signals to provide a second composite video signal according to the redefined composite image layout; and transmitting the second composite video signal to at least one of the connected sites.

* * * * *